3,428,609
POLYURETHANE COATING COMPOSITIONS AND
PROCESS OF MAKING SAME
Kenneth William Chilvers and Gordon Trappe, Manchester, England, assignors to Imperial Chemical Industries Limited, London, England, a corporation of Great Britain
No Drawing. Filed Mar. 14, 1966, Ser. No. 533,829
Claims priority, application Great Britain, Mar. 15, 1965, 10,767/65
U.S. Cl. 260—75        4 Claims
Int. Cl. C08g 22/08, 22/18

ABSTRACT OF THE DISCLOSURE

A process for the manufacture of a solution in an organic solvent of a polyurethane which comprises the steps of (1) interacting in an organic solvent which is inert to isocyanate groups a mixture of a substantially linear polymeric polyol of molecular weight within the range 800 to 5,000, and a branched polymeric polyol and/or low molecular weight polyol and an amount of an organic diisocyanate compound providing 0.95 to 1.3 isocyanate groups for each hydroxyl group present, until the resultant solution has a viscosity of from 1 to 1,500 poises at 25° C., and (2) thereafter adding a compound containing two or more hydroxyl groups in amount such that there are at least two hydroxyl groups for each isocyanate group unreacted at the end of step (1).

Disclosure

This invention relates to an improved process for the manufacture of coating compositions which are solutions of polyurethanes and to the use of these compositions.

Polyurethane elastomers, obtained from polymeric hydroxy-terminated compounds such as polyesters and polyesteramides by reaction with approximately equivalent amounts of diisocyanates, may be dissolved in organic solvents such as esters, ketones or aromatic hydrocarbons. The process of dissolving the polyurethane is, however, not attractive, since a prolonged time of mixing in heavy duty equipment is usually required. Furthermore the properties, in particular viscosity, of the solutions obtained are critically dependent upon the degree of chain extension in the preparation of the polyurethane elastomer and the reproducible preparation of these solutions requires a degree of control in the manufacture of the polyurethane which it is difficult to exercise.

We have now found that solutions of polyurethanes in organic solvents, suitable for use in the manufacture of elastomeric films, coatings and adhesives, may be obtained by interaction in an inert organic solvent of certain linear polymeric polyol compounds and excess diisocyanates in presence of controlled amounts of branched polymeric or low molecular weight polyols. Under these conditions solutions of suitable high viscosity can be obtained which can be stabilised against further viscosity increase by removal of residual free isocyanate groups by the addition of isocyanate-reactive compounds.

According to our invention therefore there is provided a process for the manufacture of a solution in an organic solvent of a polyurethane which comprises the steps of (1) interacting in an organic solvent which is inert to isocyanate groups a mixture of a substantially linear polymeric polyol of molecular weight within the range 800 to 5,000, and a branched polymeric polyol and/or low molecular weight polyol and an amount of an organic diisocyanate compound providing 0.95 to 1.3 isocyanate groups for each hydroxyl group present, until the resultant solution has a viscosity of from 1 to 1,500 poises at 25° C., and (2) thereafter adding a compound containing two or more hydroxyl groups in amount such that there are at least two hydroxyl groups for each isocyanate group unreacted at the end of step (1).

As organic solvent there may be mentioned any organic solvent which is inert towards isocyanate and hydroxyl groups, preferred solvents being esters, ketones, aromatic hydrocarbons, and chlorohydrocarbons. The amount of solvent used should be sufficient to give solutions containing from 10 to 80% of polyurethane.

As examples of polyhydroxy compounds of molecular weight of from 800 to 5,000, there may be mentioned polyethers, polyetherthioethers, polyesters, polyesteramides and polyacetals.

As examples of polyesters or polyesteramides which can be used there may be mentioned essentially linear polyesters and polyesteramides prepared by conventional methods from dicarboxylic acids, glycols and, as necessary, minor proportions of diamines or aminoalcohols. Suitable dicarboxylic acids include succinic, glutaric, adipic, suberic, azelaic, sebacic, phthalic, isophthalic and terephthalic acids and mixtures of these. Examples of dihydric alcohols include ethylene glycol, 1:2-propylene glycol, 1:3-butylene glycol, 2:3-butylene glycol, diethylene glycol, tetramethylene glycol, pentamethylene glycol, hexamethylene glycol, decamethylene glycol and 2:2-dimethyltrimethylene glycol. Suitable diamines or amino-alcohols include hexamethylene diamine, ethylene diamine, monoethanolamine, phenylenediamines, tolyene diamines, diamino diphenylmethane and benzidine. Mixtures of polyesters and polyesteramides may be used if desired. The polyesters and polyesteramides should preferably have acid value less than 5 mg. KOH/g. and a molecular weight between 1,000 and 2,700.

As examples of polyethers which can be used there may be mentioned polymers and copolymers of cyclic oxides, for example 1:2-alkylene oxides such as ethylene oxide, epichlorohydrin, 1:2-propylene oxide, 1:2-butylene oxide and 2:3-butylene oxide, oxycyclobutane and substituted oxycyclobutanes, and tetrahydrofuran. There may also be mentioned polyethers such as are prepared for example by the polymerisation of an alkylene oxide in the presence of a basic catalyst and water or a dihydro alcohol, e.g. glycol, or a primary monoamine. Mixtures of such polyethers may be used. The preferred polyethers or polypropylene ether and polytetrahydrofuran polymers.

As examples of polyether-thioethers which can be used there may be mentioned the products of the self-condensation of thioglycols and the condensation products of thioether glycols with other polyols.

As examples of polyacetals which can be used there may be mentioned the reaction products of aldehydes, such as formaldehyde, acetaldehyde and butyraldehyde, with dihydric alcohols such as ethylene glycol, propylene glycol, butylene glycol, and diethylene glycol.

Examples of suitable organic diisocyanates include aliphatic diisocyanates such as hexamethylene diisocyanate, aromatic diisocyanates such as tolylene-2:4-diisocyanate, tolylene-2:6-diisocyanate, diphenylmethane - 4:4' - diisocyanate, 3-methyldiphenylmethane-4:4'-diisocyanate, m- and p-phenylenediisocyanates, chlorophenylene - 2:4'-diisocyanate, naphthylene - 1:5-diisocyanate, naphthylene-1:4-diisocyanate, diphenyl-4:4'-diisocyanate, 4:4' - diisocyanato-3:3' - dimethyldiphenyl, diphenylether diisocyanates, and cycloaliphatic diisocyanates such as dicyclohexylmethane disocyanate, and methylcyclohexyldiisocyanate, and mixtures of these diisocyanates.

As examples of branched chain polymeric polyols which can be used, there may be mentioned polyesters, polyesteramides and polyethers obtained from a mixture of difunctional reactants and tri- or higher functional reactants. Suitable polyesters, and polyamides are, for example, those obtained in similar manner to the essentially linear polyesters, and polyamides mentioned above, using, in addition to dihydric alcohol, dibasic acid or aminoalcohol, an at least trifunctional reagent of the same type, i.e. an at least trihydric alcohol, e.g. glycerol, trimethylolpropane, 1,2,6-hexanetriol, pentaerythritol, sorbitol or mannitol; an at least tribasic acid, e.g. trimellitic acid and trimesic acid; or an amine or amino alcohol containing at least three amino, imino and/or hydroxyl groups, e.g. diethanolamine, triethanolamine, diethylene triamine or triethylene tetramine. Suitable branched polyethers are those obtained by polymerisation of alkylene oxides, particularly 1,2-propylene oxide and ethylene oxide, in the presence of a basic catalyst and polyols, aminoalcohols or polyamino compounds such as are mentioned above, or diamines such as ethylene diamine, hexamethylene diamine and 4,4'-diaminodiphenylmethane.

As examples of low molecular weight polyols which can be used, there may be mentioned glycerol, trimethylolethane, trimethylolpropane, hexanetriols, pentaerythritol, ethylene glycol, hexamethylene glycol, thiodiglycol, neopentyl glycol, bis-(2-hydroxyethoxy)benzenes and low molecular weight polyesters based on terephthalic acid.

In preparing the polyurethane solutions of the invention the proportions of reagents depend to some extent on the funtionality of the branched chain polymeric polyol or low molecular weight polyol used. When there is used a branched chain polymeric polyol or low molecular weight polyol of functionality greater than 2, only a small amount, in terms of moles per mole of linear polyol, is used. In general, the amount used will lie between the limits of 0.01 and 0.4 mole per mole of linear polyol, being preferably chosen so that the average functionality of the mixture of isocyanate-reactive compounds lies between 2.01 and 2.3. As a general rule, the use of higher proportions than those indicated above results in too rapid a change from low viscosity solutions to gelation of the reaction mixture to give ready control of the reaction. However, difunctional low molecular weight polyols, e.g. ethylene glycol, can be and are used in a higher proportion, e.g. from 0.5 to 6.0 moles per mole of the essentially linear polyol. The amount of organic diisocyanate used is such that there are from 0.95 to 1.3 isocyanate groups for every hydroxyl group present in the other reactants used in the first stage, preferably an excess lying between 5 and 30% by weight of the theoretical equivalent amount.

The first stage of the process is carried out under anhydrous conditions, and preferably at a temperature between 35 and 130° C. but temperatures between 50 and 100° C. are preferred. It may however be desirable to reduce the temperature to below these ranges near the end of the reaction in order to facilitate control of the reaction.

The reaction may be accelerated by catalysts of the kind used in reactions between isocyanates and compounds containing active hydrogen, such as organic and inorganic basic compounds, and organic compounds of metals, for example of transition metals soluble in the reaction mixture such as iron and manganese acetyl acetonate, and of tin and antimony, for example dibutyl tin dilaurate and stannous octoate, compounds of lead such as lead acetate, basic lead acetate and lead 2-ethylhexoate. As basic organic catalysts, tertiary amines are suitable, particularly 4-dimethylaminopyridine, triethylenediamine, dimethylbenzylamine, and dimethylcyclohexylamine.

Step (2) of the process of the invention may be carried out at any temperature, from room temperature to a temperature of 130° C.

As examples of compounds containing two or more hydroxyl groups which may be used in step (2) there may be mentioned ethylene glycol, 1:2-propylene glycol, 1:3- and 2:3-butylene glycols, diethylene glycol, dipropylene glycol, tetramethylene glycol, pentamethylene glycol, hexamethylene glycol, 2:2-dimethyltrimethylene glycol, diethanolamine, glycerol, trimethylol propane, trimethylolethane, pentaerythritol, castor oil and branched chain polyesters, polyesteramides and polyethers. It is preferred to use compounds in which the hydroxyl groups are not all of the same reactivity to isocyanate, such as 1:2-propylene glycol, 1:3-butylene glycol and glycerol, since these compounds allow better control of viscosity of the product.

When catalysts have been used in step (1) subsequent deactivation with, for example, an acidic compound is desirable, since such catalysts if left in the reaction mixture may give rise to shortened storage life or pot life at the application stage. Examples of suitable acidic compounds include organic acids, such as adipic acid, salicylic acid and inorganic acids such as phosphoric acid or hydrochloric acid.

The solutions prepared by the process of our invention have little tendency to exhibit thixatropy and are of especial value in the manufacture of flexible coatings and adhesives. Substrates for these include textiles of natural, artificial or synthetic materials, rubber, paper, wood, leather, metals, glass, plastics such as polyvinyl chloride and polyurethane materials such as flexible and rigid foams. The coatings obtained have excellent resistance to solvents and to solvolytic degradation.

Such solutions are particularly advantageous when used as adhesives in the lamination of plastic sheet material to a substrate. Examples of such substrates are knitted, woven or felted materials, flexible and rigid foams made from polyvinyl chloride or polyurethane. Hitherto, the lamination of plastic materials to such substrates has been found difficult to achieve. Using an adhesive solution according to our invention, these materials can be bonded together by conventional laminating techniques.

For application to these substrates the solutions are mixed with organic polyisocyanates which may contain two or more isocyanate groups, applied to the substrates by any conventional method, and the coatings so obtained are cured at any temperature between room temperature and 180° C. Organic polyisocyanates which may be used for curing include those known from the prior art to be useful for the preparation of polyurethanes, for example those diisocyanates mentioned above as suitable for the preparation of the polyurethane solution. Polyisocyanates containing more than two isocyanate groups per molecule may however be used. Examples of such polyisocyanates include the reaction products of an excess of diisocyanate with trihydric alcohols or mixtures of dihydric and trihydric alcohols, isocyanate group-containing isocyanuranate polymers of diisocyanates and polyisocyanates, as well as aromatic triisocyanates such as 2:4:4'-triisocyanatodiphenylether and 2:4:6-triisocyanatotoluene. The proportion of polyisocyanate used for curing is desirably from about 8% to 25% by weight of the solids content of the polyurethane solution, but amounts outside this range may be used if desired. When diisocyanates or polyisocyanates are used curing temperatures preferably should be between room temperature and 100° C. Isocyanate generators, such as adducts of polyisocyanates with phenols may also be used in which case curing temperatures between 70° C. and 180° C. are necessary.

The polyurethane solutions may also be converted, preferably after the addition of further polyisocyanate, into elastomeric filaments by conventional wet or dry spinning methods. The inert organic solvent may, for example, be removed by spinning into a solvent which is miscible with the inert organic solvet but is not a solvent for the prepolymer or by passing a stream of hot gas such as air over the filament after spinning.

The invention is illustrated but not limited by the following examples in which all parts and percentages are by weight unless otherwise stated.

Example 1

4.8 parts of glycerol, 0.5 part of dimethylaminopyridine and 109 parts of an 80/20 mixture of 2,4-/2,6-toluylene diisocyanate were added to a solution of 1,100 parts of polyesteramide in 1540 parts of methyl ether ketone. The resulting solution was heated at 60° C. under an atmosphere of dry nitrogen until the viscosity of the solution reached 11.6 poises at 60° C. when a solution of 37.4 parts of propylene glycol in 25 parts of methylethyl ketone was added. After heating for a further 1½ hours at 60° C. a solution of 0.7 part of salicylic acid in 10 parts of methylethyl ketone was added and heating at 60° C. continued for 3 hours. The resulting solution had a viscosity at 25° C. of 22.8 poises and had changed little in viscosity after 6 months storage at ordinary temperature.

The polyesteramide used in this example was prepared by heating a mixture of 2336 parts of adipic acid, 1000 parts of ethylene glycol, 96 parts of diethylene glycol and 61 parts of monoethanolamine at 240° C. and had an acid value of 1.6 mgm. KOH/g. and hydroxyl value of 54.4 mgm. KOH/g.

Example 2

The solution obtained in Example 1 was cured with a polyisocyanate solution which consisted of a 75% solution by weight in ethyl acetate of the reaction product of a mixture of 5 molar proportions of glycerol and 4 molar proportions of diethylene glycol with an 80/20 mixture of 2,4-/2,6-toluylene diisocyanate isomers in amount such that there was one molecule of toluylene diisocyanate for each hydroxyl group of the polyol mixture. 25 parts of the polyisocyanate solution were mixed with 200 parts of the polyurethane solution and the mixture flowed as a film on a glass plate. After 4 days at ordinary temperature the film was no longer soluble in methylethyl ketone.

What we claim is:
1. A process for the manufacture of a solution in an organic solvent of a polyurethane which comprises the steps of
  (1) interacting in an organic solvent which is inert to isocyanate groups a mixture of
    (A) a substantially linear polymeric polyol of molecular weight within the range 800 to 5,000, and
    (B) a branched chain polymeric polyol and/or low molecular weight polyol, and
    (C) an amount of an organic diisocyanate compound providing 0.95 to 1.3 isocyanate groups for each hydroxyl group present, until the resultant solution has a viscosity of from 1 to 1,500 poises at 25° C., and
  (2) thereafter adding a compound containing at least two hydroxyl groups in amount such that there are at least two hydroxyl groups for each isocyanate group inreacted at the end of step (1).
2. A process as claimed in claim 1 wherein step (1) of the process is carried out in the presence of a catalyst of the kind used in reactions between isocyanates and compounds containing active hydrogen.
3. A process as claimed in claim 1 wherein the compound used in step (2) is a compound in which the hydroxyl groups are not all of the same reactivity to isocyanate.
4. A process as claimed in claim 1 wherein the amount of organic diisocyanate used is sufficient to provide an excess lying between 5 and 30% by weight of the theoretical amount necessary to react with every hydroxyl group present in the other reactants used in the first stage.

References Cited

UNITED STATES PATENTS

| 2,912,408 | 11/1959 | Nischk et al. | 260—75 |
| 3,255,068 | 6/1966 | Smith | 260—75 |
| 3,255,069 | 6/1966 | Crowley et al. | 161—190 |

FOREIGN PATENTS

| 483,225 | 5/1952 | Canada. |

OTHER REFERENCES

Ser. No. 397,741, Schlack (A.P.C.), published Apr. 20, 1943.

Wells et al.: Official Digest, September 1959, pp. 1193–1194 cited as being of interest, call No. TP934.F29.

Bailey: SPE Journal, February 1958, pp. 41–43 and 68–69 cited as being of interest, call No. TP986.A1S2.

DONALD E. CZAJA, *Primary Examiner.*

M. J. WELSH, *Assistant Examiner.*

U.S. Cl. X.R.

260—32.8; 117—138.8, 148, 142, 124, 132, 155; 156—331; 161—190; 260—77.5